United States Patent [19]
Appolonia et al.

[11] Patent Number: 5,363,658
[45] Date of Patent: Nov. 15, 1994

[54] APPARATUS AND PROCESS FOR CHILLING FOOD PRODUCTS

[75] Inventors: John Appolonia, Yardley; Steve McCormick, Warrington, both of Pa.; Robert Boddaert, Washington, N.J.

[73] Assignee: The BOC Group, Inc., Murray Hill, N.J.

[21] Appl. No.: 90,347

[22] Filed: Jul. 9, 1993

[51] Int. Cl.⁵ ............................................. F25D 13/06
[52] U.S. Cl. ................................................ 62/63; 62/381
[58] Field of Search ..................................... 62/63, 381

[56] References Cited

U.S. PATENT DOCUMENTS

| | | | |
|---|---|---|---|
| 3,368,366 | 2/1968 | Keeling | 62/381 |
| 3,787,699 | 1/1974 | Menachem et al. | 62/381 |
| 4,305,261 | 12/1981 | Becker et al. | 62/381 |
| 4,539,824 | 9/1985 | Kuraoka et al. | 62/380 |
| 4,788,907 | 12/1988 | Mizutani et al. | 62/381 |
| 5,040,374 | 8/1991 | Micheau | 62/384 |

*Primary Examiner*—Ronald C. Capossela
*Attorney, Agent, or Firm*—David A. Draegert; Larry R. Cassett

[57] ABSTRACT

Apparatus and method for chilling a food product which includes a food distribution device having a pair of circular members including at least one spaced-apart partition defining a food receiving area; the circular members rotating to cause food delivered to the food product receiving area to fall into a food storage compartment in a uniform manner; and a cryogen releasing device connected to one of the circular members which uniformly distributes a cryogenic substance to the food product within the food storage compartment.

21 Claims, 4 Drawing Sheets

APPARATUS AND PROCESS FOR CHILLING FOOD PRODUCTS

TECHNICAL FIELD

The present invention is generally directed to a device for chilling a food product in which the food product is uniformly distributed within a food receiving vessel while simultaneously being uniformly treated with a cryogenic substance to effect cooling.

BACKGROUND OF THE PRIOR ART

Commercial procedures for treating freshly killed poultry or meat generally require that the temperature of the fresh killed product be reduced in accordance with standards established by the United States Department of Agriculture (USDA). Conventionally, the fresh killed product is treated with brine to lower the temperature of the food product to about 45° F. This procedure reduces water loss in the product, prevents the growth of bacteria and extends the shelf life of the food product.

The brine treated product is then cut and/or ground as desired prior to packaging. The cutting/grinding step generates heat thereby increasing the temperature of the food product. Prior to packaging the food product, however, it is necessary to lower the temperature of the food product in the range of from about 30° to 40° F.

Conventional methods of chilling the food product after it has been cut/ground and treated with brine involve manual operations. Specifically, the food product is placed in a large, often times rectangular vessel. Dry ice in the form of pellets is shoveled into the vessel to lower the temperature of the food product to meet USDA requirements.

Such manual systems, however, are inefficient and inconsistent. The shoveling of dry ice into the receiving vessel often produces localized cold spots so that a portion of the food product is chilled to lower than necessary temperatures while other portions of the food product remain above desired temperatures. To date, there is no apparatus or method which uniformly distributes the food product within the storage vessel and uniformly treats the food product with a coolant as it is distributed within the vessel.

It would be a significant advance in the art of chilling food products, if the food product can be uniformly distributed within the food receiving vessel while receiving a uniform distribution of a coolant.

SUMMARY OF THE INVENTION

The present invention is generally directed to an apparatus and process for chilling a food product. The apparatus comprises a food distribution means for delivering the food product in a uniform manner to a food storage compartment. The food distribution means is operatively engaged at the top of the food storage compartment and serves the function of uniformly distributing the food product within the food storage compartment. On the underside of the food distribution means is a cryogen releasing means. The cryogen releasing means releases a cryogenic substance onto the food product in a uniform manner as the food product is uniformly distributed within the food storage compartment.

As a consequence of the present invention, the food storage compartment receives a uniform distribution of the food product which in turn is uniformly cooled to USDA standards without localized cold spots brought about by uneven coolant distribution.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to an apparatus and a process for chilling food products, particular meat and poultry, in an efficient and uniform manner. The present device receives the food product from a source such as a conveyer belt and through a unique food distribution means distributes the food product within a food storage compartment in a uniform manner. Coupled to the food distribution means, in accordance with another aspect of the present invention, is a cryogen releasing means which releases a cryogenic substance in a manner which eliminates cold spots and uniformly cools the food product loaded within the food storage compartment by the food distribution means.

Figure 1:
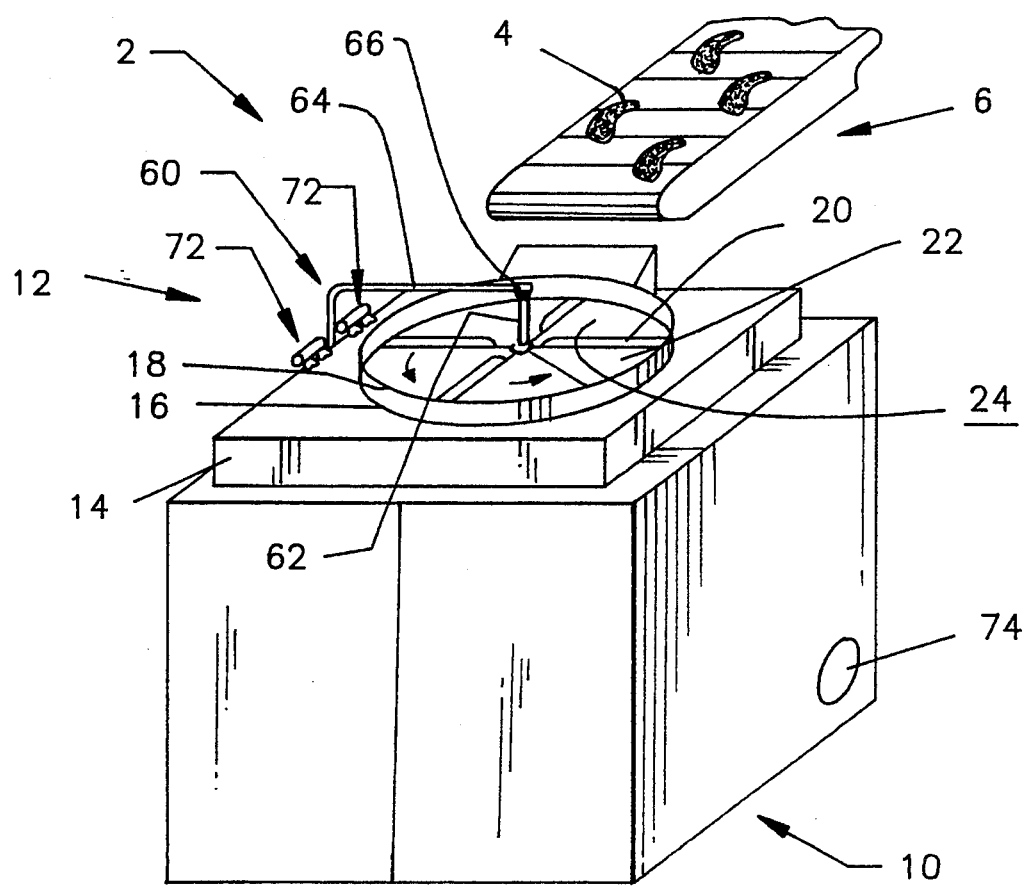
FIG. 1 is a perspective view of an embodiment of the invention for chilling a food product received from a conveyor.
Figure 2:
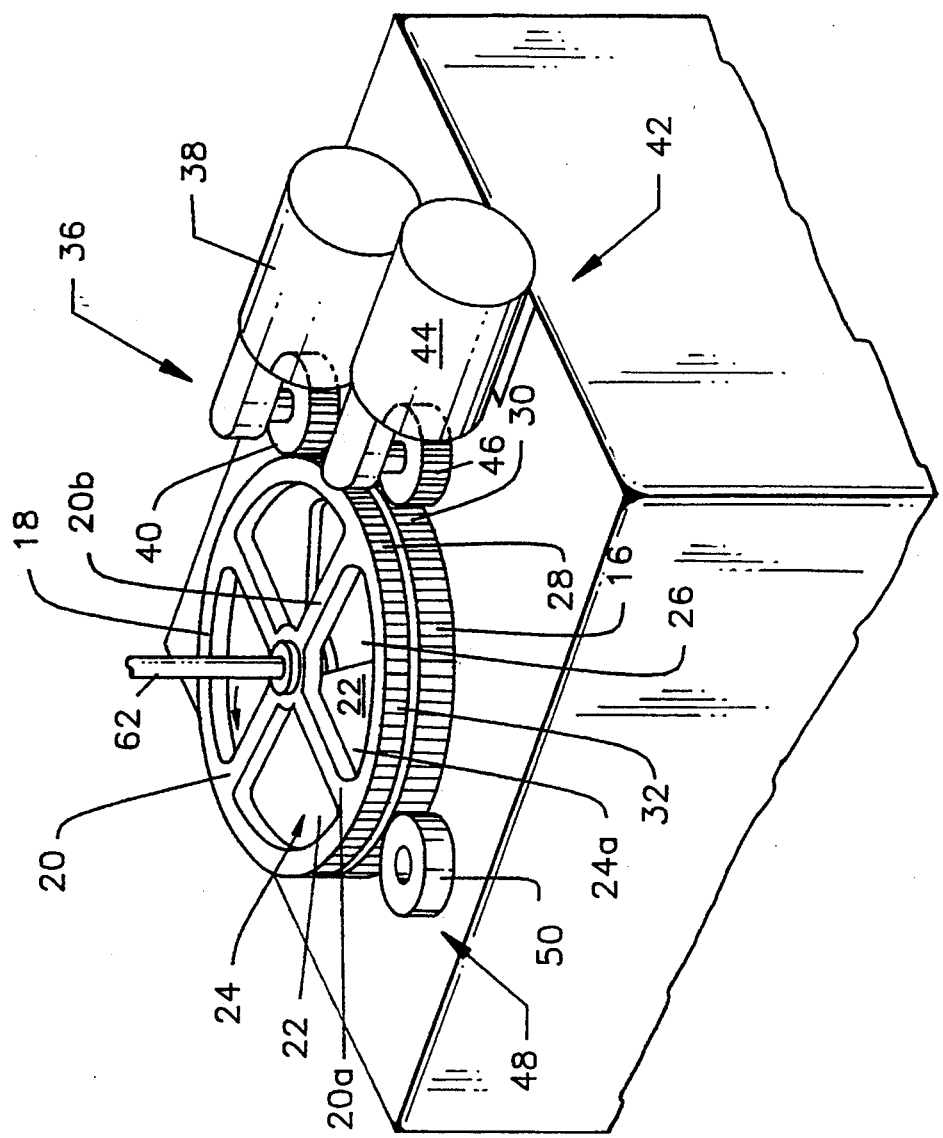
FIG. 2 is a perspective view of the food distribution means associated with the top of the food storage compartment for receiving the food product and for distributing the food product uniformly within the food storage compartment.

Referring to FIGS. 1 and 2, the apparatus for chilling a food product is shown generally by numeral 2. The food product 4, such as cut meat and/or poultry, is delivered to the chilling apparatus 2 by a conventional means such as a conveyor belt 6. The apparatus generally includes a storage compartment 10 for receiving the food product 4 and a food distribution device 12 which receives the food product 4 from the conveyor belt 6 and distributes the food product uniformly within the storage compartment 10 as explained hereinafter.

The food distribution device 12 includes a base 14, a first circular member 16 and a second circular member 18 as shown specifically in FIG. 2. The second circular member 18 includes at least one, preferably a plurality of spaced-apart partitions 20 (four partitions are shown) which together with the upper surface 22 of the first circular member 16 form a corresponding number of food receiving areas 24. The upper surface 22 of the first circular member 16 has an opening 26 therein which is of sufficient size to enable the food product 4 to pass therethrough and into the storage compartment 10.

The first circular member 16 and the second circular member 18 rotate in a non-congruent manner. That is, for example, the second circular member 18 may either rotate at a different speed than the first circular member 16 and/or rotate in different direction than the first circular member 16. The rotation of the respective circular members 16,18 in a non-congruent manner is designed to urge the food product 4 which is received in the food receiving areas 24 into the opening 26 by the partitions 20.

The relationship between the first circular member 16 and the second circular member 18 is best shown by reference to FIG. 2. When the food product 4 is received within a food receiving area 24a, the partitions 20a and 20b which border the food receiving area 24a rotate in a non-congruent manner such as by rotating at a speed greater than that of the first circular member 16. Accordingly, the food product is caused to move across the upper surface 22 of the first circular member 16 until the food product reaches the opening 26 and falls into the storage compartment 10. As previously indicated, the same results can be achieved by reversing the rotation of the second circular member 18 with respect to the first circular member 16.

Rotation of the first and second circular members 16,18 may be accomplished by a gear driving mechanism having respective gear wheels which engage the outer rim of the respective circular members. Referring to FIG. 2, there is shown the first circular member 16 having an outside edge 28 composed of gear teeth 30. The second circular member 18 has a corresponding outside edge 32 composed of similar gear teeth 34.

The gear teeth 34 of the second circular member 18 are engaged by a first gear drive 36 comprising a motor 38 and a gear wheel 40. In operation, the rotation of the gear wheel 40 causes the first circular member 16 to rotate in a like manner at a set speed. A similar gear drive 42 comprising a motor 44 and corresponding gear wheel 46 is provided for the first circular member 16 which causes the first circular member 16 to rotate at a desired speed.

In one embodiment of the invention the gear wheel 40 causes the second circular member 18 to rotate at a rate of speed different than that of the first circular member 16. In another embodiment of the invention, the gear wheel 40 may be caused to rotate in a direction opposite to that of the corresponding gear wheel 46 which controls movement of the first circular member 16. Accordingly, the food product which enters the food receiving area 24 will be contacted by a partition 20 bordering the food receiving area 24 and pushed along the surface 22 of the first circular member 16. Eventually, the food product 4 will be urged into the opening 26 and deposited within the storage compartment 10.

Gear drive 40 may be provided with respective ratchet clutches (not shown), known in the art, (e.g. model #400 manufactured by MAYR). The ratchet clutch serves to stop the motion of the second circular member 18 when the food product 4 is lodged between one of the partitions 20 and the side of the opening 26 in the upper surface 22 of the first circular member 16. This optional device is provided to prevent damage to the apparatus on the rare occasion when the food product 4 may become lodged between the first and the second circular members 16 and 18.

The food distribution device 12 may also be optionally provided with one or more, preferably three, guide wheels 48 which provide support for the first circular member 16. Each guide wheel 48 has an outer rim 50 which rotates and engages the outside edges of the first circular member 16 to assure that the first circular member 16 rotates smoothly when in operation.

The food distribution system described above effectively transports the food product 4 through the opening 26 at spaced-apart intervals thereby distributing the food product 4 within the storage compartment 10 in a uniform manner. As a consequence, the food product 4 is evenly distributed throughout the entire volume of the storage compartment 10.

In another aspect of the present invention there is provided a unique cooling device which relies on a cryogenic substance to cool the food product contained within the food storage compartment. In accordance with the present the invention, a cryogen releasing device is attached to the underside of the first circular member and releases a cryogenic substance as the first circular member is rotated above the storage compartment.

Figure 3:
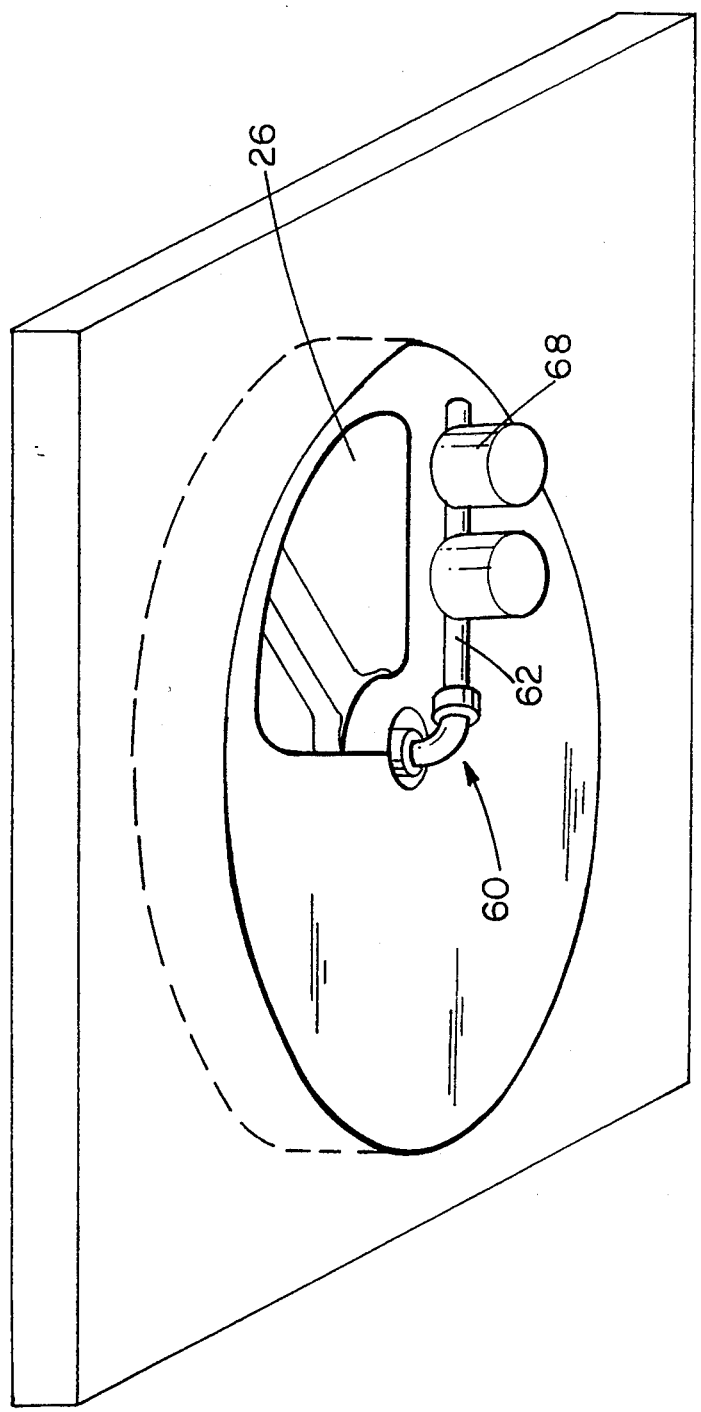
FIG. 3 is a side view of an embodiment of the cryogen releasing means for uniformly distributing a cryogenic substance into the food storage compartment as food is released through the opening of the food distribution means.

Referring to FIGS. 1-3, there is disclosed a cryogen releasing device 60 shown affixed to the underside of first circular member 16. The cryogen releasing device 60 is shown proximate to the opening 26 in the first circular member 16. It should be noted, however, that the cryogen releasing device 60 may be positioned anywhere along the underside of the first circular member 16.

The cryogen releasing device 60 includes a first conduit 62 and a second conduit 64 which are connected together by a coupling device 66. The second conduit 64 is connected to a source of cryogen (not shown). The first conduit 62 which extends upwards through the first and second circular members 16, 18 is connected to at least one device for releasing the cryogenic substance in the desired form for cooling.

Figure 4:
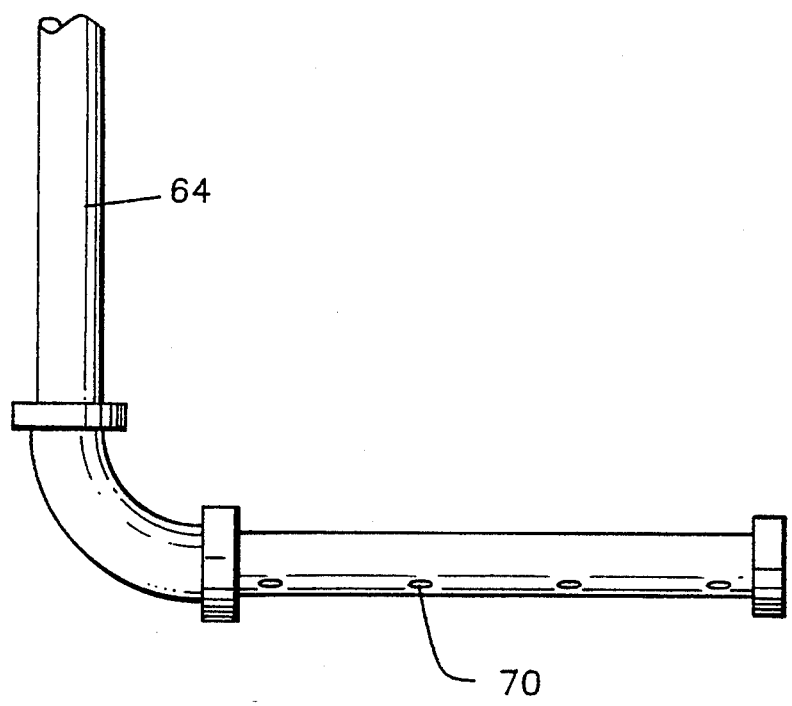
FIG. 4 is a side view of another embodiment of the cryogen releasing means.

As shown in FIGS. 3 and 4, when the cryogenic substance is carbon dioxide, at least one cone-shaped generator 68 is provided for forming solid flakes of carbon dioxide and releasing the flakes of carbon dioxide onto the food product contained within the vessel. The solid flakes of carbon dioxide are formed in a conventional manner. More specifically, carbon dioxide is generally shipped and stored in pressure vessels at 300 psig and 0° F., in liquid form. When cooling is needed, it is transferred via a pipe to an orifice. Upon injection through an orifice the liquid changes state to a solid and gas at atmospheric conditions. The amount of solid formed is approximately 43%. The shape of the snow cones or snow generators 68 concentrate the solid carbon dioxide particles forcing them to collide and form larger particles referred to as snow. This snow then contacts the product to be cooled and sublimates giving up its cooling capacity. The cryogenic substance is released through the cones 68 as the cryogen releasing device is rotated in accordance with the rotation of the first circular member 16.

In an alternative embodiment of the invention, the cryogenic substance may be a liquid, such as liquid nitrogen. The first conduit 62 is provided with a series of spaced-apart openings 70 as shown in FIG. 4 to allow the liquid nitrogen to drip onto the food product within the storage compartment. Exhaust cryogen is released from the storage vessel through an exhaust port 74 as shown in FIG. 1.

The flow of the cryogenic substance to the cryogen releasing device 60 is controlled by a valve arrangement 72 shown generally in FIG. 1. The flow of the cryogenic substance may be controlled by adjusting the valve arrangement 72 to limit the amount of cryogenic substance entering the second conduit 64 to a percentage of the total flow capacity. For example, if the conduit 64 is capable of handling 50 pounds per minute of the cryogenic substance (e.g. carbon dioxide or nitrogen) at full production, then the valve 72 could be set at 50% open if only 25 pounds per minute of flow are needed.

Alternatively, the valve arrangement 70 can be turned on and off at spaced-apart intervals. As a result, the valve will be opened a percentage of the time and closed the remaining time. For example, if 50 pounds per minute of the cryogenic substance represented full capacity and only 75% of full capacity were desired, the valve arrangement 72 could be set in the open position for 45 seconds and in the closed position for 15 seconds by a conventional timing device (not shown).

EXAMPLE 1

A storage compartment capable of housing approximately 2200 pounds of meat or poultry is employed for receiving the food product from a conveyor as shown in FIG. 1. The food product is supplied at a rate sufficient to fill the storage compartment in approximately fifteen minutes. The temperature of the food product entering the chilling apparatus is approximately 45° F. and the temperature of the food product within the storage compartment is required to be about 35° F. Employing turkey as an example, which has a specific heat of about 0.8 Btu/lb. ° F., requires the removal of 17,600 Btu in fifteen minutes corresponding to approximately 70,400 Btu/hr.

In order to remove this amount of heat, the apparatus as shown in FIG. 1 is supplied with liquid carbon dioxide which removes heat at the rate of 113 Btu/lb. Since the removal of 70,400 Btu/hr is equivalent to 1173 Btu per minute, approximately 10.4 lbs. of liquid carbon dioxide must be supplied to the storage vessel per minute in order to reduce the temperature of the turkey product from 45° F. to 35° F.

EXAMPLE 2

The same apparatus as described in Example 1 was employed for cooling turkey except that liquid nitrogen was used as the cryogenic substance with the cryogen releasing device shown in FIG. 4. Since liquid nitrogen removes heat at the rate of 85.6 Btu per minute, 13.7 lbs. of liquid nitrogen per minute would be required to reduce the temperature of the turkey product from 45° F. to 35 ° F.

What is claimed is:

1. Apparatus for chilling a food product comprising:
   (a) a food storage compartment for receiving the food product while in motion from a food distribution means and for storing the food product at rest;
   (b) food distribution means operatively engaged to the top of the food storage compartment for receiving the food product from a source and for uniformly distributing the food product within the food storage compartment; and
   (c) means for cooling the food product while the food product is contained within the food storage compartment.

2. The apparatus of claim 1 wherein the means for cooling the food product comprises a cryogen releasing means operatively engaged to the underside of the food distribution means for uniformly releasing a cryogenic substance onto the food product as the food product is uniformly distributed within the food storage compartment to thereby cool the food product.

3. Apparatus for chilling a food product comprising:
   (a) a food storage compartment for receiving the food product from a food distribution means;
   (b) food distribution means operatively engaged to the top of the food storage compartment for receiving the food product from a source and for uniformly distributing the food product within the food storage compartment said food distribution means comprising;
      (i) a first circular member having an upper and lower surface and an opening therein sufficient for the food product to pass therethrough,
      (ii) means for rotating the first circular member,
      (iii) a second circular member positioned above the first circular member comprising at least one partition and together with the upper surface of the first circular member forming at least one food receiving area on the upper surface of the first circular member,
      (iv) means for rotating the second circular member in a non-congruent manner with respect to the first circular member, whereby the food product which is placed on the upper surface of the first circular member is caused to fall through the opening in the first circular member into the food storage compartment when one of said partitions contacts the food product and urges said food product into said opening; and
   (c) means for cooling the food product.

4. The apparatus of claim 3 wherein the means for rotating the first circular member rotates the first circular member at a speed different than that of the second circular member.

5. The apparatus of claim 3 wherein the means for rotating the first circular member rotates the first circular member in a different direction than the second circular member.

6. The apparatus of claim 3 wherein the cryogen releasing means comprises a conduit affixed to a lower surface of the first circular member and connected to a source of a cryogenic substance, and a releasing means operatively connected to the conduit for releasing the cryogenic substance as the first circular member is rotated.

7. The apparatus of claim 6 wherein the releasing means comprises a solid flake generator.

8. The apparatus of claim 6 wherein the releasing means comprises a plurality of openings in the conduit of sufficient size to enable a liquid cryogen to pass therethrough.

9. The apparatus of claim 6 further comprising means for intermittently releasing the cryogenic substance into the vessel.

10. The apparatus of claim 6 further comprising means for varying the rate at which the cryogenic substance is released into the vessel.

11. The apparatus of claim 3 further comprising means for terminating or reversing the rotation of the second circular member when the food product becomes wedged between a partition of the second circular member and the opening within the first circular member.

12. The apparatus of claim 3 wherein the second circular member comprises a plurality of spaced-apart partitions forming a plurality of food receiving areas.

13. A method of chilling a food product comprising:
   (a) delivering a food product to an upper surface of a first circular member having an opening therein, said opening adapted to receive the food product and deliver the food product to a food storage vessel;

(b) rotating the first circular member;

(c) rotating a second circular member in a non-congruent manner with respect to said first circular member; said second circular member, comprising at least one partition, together with the first circular member forming at least one food receiving area on the surface of the first circular member; said second circular member being rotated in a manner so that the partitions contact the food product in said food receiving portions and urge the food product into said opening; and (d) adding a coolant to the food storage vessel.

14. The method of claim 13 wherein the step of adding a coolant to the food storage compartment comprises releasing a cryogenic substance from the first circular member into the food storage compartment as the first circular member is rotated.

15. The method of claim 14 wherein the cryogenic substance is released in the form of solid flakes.

16. The method of claim 14 wherein the cryogenic substance is released in the form of a liquid.

17. The method of claim 13 comprising rotating the first circular member at a different speed than the second circular member.

18. The method of claim 13 comprising rotating the first circular member in a different direction than the second circular member.

19. The method of claim 14 comprising releasing the cryogenic substance at a controlled rate into the food storage compartment.

20. The method of claim 19 comprising intermittently releasing the cryogenic substance into the food storage compartment.

21. The method of claim 13 wherein the second circular member comprises a plurality of partitions forming a plurality of food receiving areas.

* * * * *